United States Patent [19]
Catlin et al.

[11] Patent Number: 5,133,873
[45] Date of Patent: Jul. 28, 1992

[54] PROCESS FOR REMOVAL OF COPPER IONS FROM AQUEOUS EFFLUENT

[75] Inventors: Joseph C. Catlin, Hanahan; Margaret D. Ellis, Mt. Pleasant; James J. Good, Charleston; Mark A. Putnam; Neal E. Tonks, both of Hanahan; Donald V. Wood, Goose Creek, all of S.C.

[73] Assignee: Miles Inc., Pittsburgh, Pa.

[21] Appl. No.: 659,583

[22] Filed: Feb. 22, 1991

[51] Int. Cl.$^5$ .............................................. C02F 1/62
[52] U.S. Cl. ..................................... 210/715; 75/726; 204/150; 210/719; 210/724; 210/737; 210/912
[58] Field of Search .................. 75/726; 204/150, 152; 210/702, 715, 719, 720, 723, 724, 737, 912

[56] References Cited

U.S. PATENT DOCUMENTS

| | | | |
|---|---|---|---|
| 3,154,411 | 3/1972 | Back et al. | 75/109 |
| 3,766,036 | 10/1973 | McKaveney | 210/723 |
| 3,857,703 | 12/1974 | McGriffen | 75/726 |
| 3,905,827 | 9/1975 | Goffredo et al. | 210/719 |
| 3,922,224 | 11/1975 | Lewandowski | 210/720 |
| 3,985,554 | 10/1976 | McCoy | 75/726 |
| 4,096,064 | 6/1978 | du Fresne | 210/914 |
| 4,152,229 | 5/1979 | Soltys et al. | 204/150 |
| 4,163,716 | 8/1979 | Turnbull | 210/912 |
| 4,194,973 | 3/1980 | Smith | 210/719 |
| 4,244,795 | 1/1981 | Raats et al. | 204/105 R |
| 4,280,887 | 7/1981 | Konstantouros | 204/150 |
| 4,740,244 | 4/1988 | Williams | 75/109 |
| 4,950,326 | 8/1990 | Holly | 210/912 |

OTHER PUBLICATIONS

Murray, "A Sacrificial Metal Corrosion Control Process;" *Water & Sewage Works* Jan. 1966, pp. 19-26.
O. P. Case, "Metallic Recovery from Waste Water Utilizing Cementation" in Environmental Protection Tech. Series EPA-670/2-74-008 (Jan., 1974).
F. S. Wartman and A. H. Roberson, "Precipitation of Copper from an Acid Mine Water" in Report of Investigations R.I. 3746, Bureau of Mines, U.S. Dept. of Interior (1944).
H. V. Winchell, "Precipitation of Copper from Mines Waters" (letter) in Mining & Scientific Press, 104, 314 (1912).
R. M. Nadkarni et al., "A Kinetic Study of Copper Precipitation on Iron—Part I" in Trans. Metallurgical Soc. AIME, 239, 581-585 (1967).
R. M. Nadkarni and M. E. Wadsworth, "A Kinetic Study of Copper Precipitation on Iron: Part II" in Trans. Metallurgical Soc. AIME, 239, 1066-1074 (1967).
W. W. Fisher and R. D. Groves, "Copper Cementation in a Revolving-Drum Reactor, A Kinetic Study" in Report of Investigations R.I. 8098, Bureau of Mines, U.S. Department of Interior (1976).
P. H. Strickland and F. Lawson, "The Cementation of Metals from Dilute Aqueous Solution" in Proc. Aust. Inst. Min. Met., No. 236, 71-79 (1971).
A. E. Back, J. Metals, 19, 27-29 (1967).
K. Kubo et al., J. Chem. Eng. Japan, 12, 495, 497 (1979).
W. W. Fisher, Hydrometallurgy, 16, 55-67 (1986).

*Primary Examiner*—Peter Hruskoci
*Attorney, Agent, or Firm*—Joseph C. Gil; Richard E. L. Henderson

[57] ABSTRACT

This invention relates to a process for removing copper ions from highly acidic waste water generated during the manufacture of dyes or pigments or intermediates thereof. The waste water is exposed at a pH less than about 1 to a bed of suspended iron particles, preferably a fluidized bed of iron particles, having a particle size of from about 200 to about 950 micrometers.

14 Claims, 2 Drawing Sheets

PROCESS FOR REMOVAL OF COPPER IONS FROM AQUEOUS EFFLUENT

BACKGROUND OF THE INVENTION

This invention relates to a process for removing copper ions from highly acidic waste streams generated during the manufacture of certain dyes or pigments or intermediates thereof by passing the acidic waste streams through a bed of suspended iron particles, preferably a fluidized bed of iron particles. During the process, metallic copper is deposited on the iron.

Various industrial and mining waste waters can contain environmentally unacceptable levels of copper ions. For example, waste streams containing copper can be generated during the manufacture of copper-containing dyes or pigments. Aqueous solutions and sludges containing copper can also be generated in various synthetic processes that use copper, such as the Ullmann reaction, in which aryl halides are coupled to form biphenyls and related compounds; the Sandmeyer reaction, in which aromatic diazonium groups are replaced with halo or cyano groups; and other processes. The amount of copper in these wastes can exceed the levels that can be routinely handled in standard waste treatment facilities. Therefore, efficient, economical removal of copper ions from industrial and mining waste streams has long been sought.

Various techniques for removing copper ions from acidic effluents are theoretically possible and some have been commercialized. Each of the known methods, however, has certain disadvantages that hinder its usefulness for removing copper ions from these effluents. For example, many such methods are useful only for relatively simple idealized systems.

The mining industry, on the other hand, has developed many practical techniques to recover metals that would otherwise be lost. These techniques can often be adapted for use by industries such as the dye and pigment industries, but significant differences between the waste streams exist. For example, industrial waste streams typically contain less copper, more acid (as well as more types of acids), and a higher organic load than metallurgical (e.g., mining) streams. See O.P. Case, "Metallic Recovery from Waste Waters Utilizing Cementation" in Environmental Protection Technology Series EPA-670/2-74-008 (January, 1974). In addition, the organic load, especially for pigments, includes insoluble matter. Thus, those methods used by the mining industry may not always be applicable in more complex systems.

Copper can be removed from acidic solutions by precipitation of insoluble copper-containing compounds. See, for example, F. S. Wartman and A. H. Roberson, "Precipitation of Copper from an Acid Mine Water" in Report of Investigations R.I. 3746, Bureau of Mines, U.S. Department of Interior (1944). For example, the addition of hydroxides or carbonates to such solutions precipitates copper oxides or hydroxides. Copper can even be removed effectively by co-precipitation with ferric hydroxide. Copper can also be precipitated by adding sulfites or sulfides. These processes, however, tend to produce fine solids or gels that can be difficult to filter. In addition, disposal of this solid waste can be economically and environmentally troublesome.

Ionic copper can be reduced to low concentrations by ion exchange methods and can often be recovered from the ion exchange resins in relatively high purity. Ion exchange methods, however, are generally expensive, both in materials and in equipment. Moreover, solids in the effluent can severely hinder their efficiency.

Another method for removing copper from acidic effluents is electrolytic deposition of copper at a cathode. E.g., U.S. Pat. No. 4,152,229. In one variant, a conducting rod is immersed in copper particles that are stirred in such a way that the particles intermittently contact the rod and complete the circuit; the growing copper particles can be removed and replaced as necessary. E.g., U.S. Pat. No. 4,244,795. In this variant, the anode is typically an inert metal. In another variant, the anode is a relatively more electronegative metal such as iron that is converted to an insoluble hydroxide or other derivative. E.g., U.S. Pat. No. 4,280,887. Although electrolysis can be efficient, the method has certain disadvantages. For example, the electrolytic process requires equipment that can be difficult to maintain. In addition, electrolysis can liberate flammable hydrogen gas as a by-product. Not only does this present a safety problem, it represents inefficient use of electricity.

The same general oxidation-reduction reaction that occurs during electrolysis can also be used in a method that does not require an external source of electricity, the so-called cementation method. It has been known for hundreds of years that metallic iron can be used to precipitate copper from aqueous solutions, particularly from the effluent generated during copper mining. H. V. Winchell, "Precipitation of Copper from Mine Waters" (letter) in *Mining & Scientific Press.* 104, 314 (1912). See also F. S. Wartman and A. H. Roberson, "Precipitation of Copper from an Acid Mine Water" in Report of Investigations R.I. 3746, Bureau of Mines, U.S. Department of Interior (1944); R. M. Nadkarni et al, "A Kinetic Study of Copper Precipitation on Iron—Part I" in *Trans. Metallurgical Soc. AIME.* 239, 581-585 (1967); and R. M. Nadkarni and M. E. Wadsworth, "A Kinetic Study of Copper Precipitation on Iron Part II" in *Trans. Metallurgical Soc. AIME.* 239, 1066-1074 (1967). When a solution containing ionic copper is exposed to iron (or another metal that is more electronegative than copper), the ionic copper is reduced and deposited as copper metal while metallic iron is simultaneously oxidized to ferrous iron. Depending on the specific conditions, the ferrous iron is formed as a soluble iron salt or complex or as an insoluble or partly soluble iron compound. Variants of this basic method have used aluminum turnings to remove copper from etchant rinse water in the manufacture of circuit boards (e.g., U.S. Pat. No. 3,905,827) and steel wool to recover silver (e.g., U.S. Pat. No. 4,740,244).

Under acidic conditions, a competing reaction of iron with acid generates hydrogen gas. The competing reaction not only wastefully consumes iron without plating out copper, but, as with the electrolysis methods described above, the hydrogen gas by-product also creates potential safety problems. It has been reported that as a solution is made more acidic than about pH 2 to 3, the rate of copper deposition is almost unchanged but iron consumption increases dramatically. See Wartman and Roberson at pages 3 to 4, and W. W. Fisher and R. D. Groves, "Copper Cementation in a Revolving-Drum Reactor, A Kinetic Study" in Report of Investigations R.I. 8098, Bureau of Mines, U.S. Department of Interior (1976) at page 18; see also Nadkarni and Wadsworth at page 1068. In contrast, the process of the present invention is surprisingly effective at removing copper at much higher concentrations of acid (for example, at a pH less than 1).

Cementation has been carried out using finely divided iron (e.g., powdered or fibrous), particulate or sponge iron, or iron spheres or shot, either batchwise or continuously in columns. See, for example, P. H. Strickland and F. Lawson, "The Cementation of Metals from Dilute Aqueous Solution" in *Proc. Aust. Inst. Min. Met.*, No. 236, 71–79 (1971); A. E. Back, *J. Metals*, 19 27–29 (1967) (particulate iron); O. P. Case, "Metallic Recovery from Waste Waters Utilizing Cementation" in Environmental Protection Technology Series EPA-670/2-74-008 (January, 1974) at pages 9–22 (shot) and 23 (powder); and K. Kubo et al, *J. Chem. Eng. Japan.* 12, 495–497 (1979) (spheres). Although often effective in reducing copper levels, the deposition of copper generally makes this method unsuitable for use over extended periods. For example, buildup of copper within the flow channels of a packed bed eventually reduces flow rates and can cause individual pieces of iron to clump or fuse into a mass that can be difficult to remove from the apparatus.

Modified cementation procedures intended to improve the removal of copper have been reported. For example, U.S. Pat. No. 3,766,036 discloses the use of special silicon-metal alloys, including iron-silicon alloys, to remove ionic metallic impurities, such as copper ions, from aqueous solutions. The present invention does not require such exotic materials.

Other modifications of the basic cementation method rely on agitation or stirring. Although stirrers or rotating discs can in theory be used to keep the iron in motion (P. H. Strickland and F. Lawson, "The Cementation of Metals from Dilute Aqueous Solution" in *Proc. Aust. Inst. Min. Met.*, No. 236, 71–79 (1971)), wear and breakage would be expected to reduce their effectiveness.

Tumbling iron nails in a revolving drum reactor has been used to provide agitation during the cementation process. See W. W. Fisher, Hydrometallurgy. 16, 55–67 (1986); and W. W. Fisher and R. D. Groves, "Copper Cementation in a Revolving-Drum Reactor, A Kinetic Study" in Report of Investigations R.I. 8098, Bureau of Mines, U.S. Department of Interior (1976). Although tumbling may inhibit fusion of the nails by keeping them in motion, the references indicate that the primary purpose of the apparatus is to fluidize unattached fragments of copper, which can thus intermittently contact the iron nails and thereby grow in a manner analogous to the electrolytic process discussed above. For the most part, the nails would be expected to remain in contact with one another and, although in motion, would not themselves be fluidized in a way that would maximize the exposed surface area of the iron at any given moment.

A method that fluidizes the iron, on the other hand, might be expected to inhibit fusion of the individual particles of iron. It has been reported that up to 99% of the copper contained in dilute aqueous solutions can be precipitated using particulate iron that has been fluidized in an inverted coneshaped fluidizer. A. E. Back *J. Metals*, 19. 27–29 (1967), and U.S. Pat. No. 3,154,411. These references disclose use of a pH range of about 2.4 to 3.0, an acidity level in accord with the previously reported optimum range of about pH 2 to 3 discussed above but much less acidic than is used in the process of the present invention.

An object of the present invention was to devise a continuous high-volume process for efficiently reducing copper ion concentrations in highly acidic waste streams formed during the production of dyes or pigments to very low levels using relatively inexpensive reagents. It was a further object to develop a method that produces metallic copper as a by-product that could be recovered for recycling, thereby reducing the generation of unusable solid waste. These objects have been achieved by passing highly acidic waste streams upward through a fluidized bed of iron particles such as chilled iron grit, an irregularly shaped form of iron.

SUMMARY OF THE INVENTION

This invention relates to a process for removing copper ions from highly acidic waste water generated during the manufacture of dyes or pigments or intermediates thereof comprising exposing said highly acidic waste water at a pH less than about 1 to a bed of suspended iron particles having a particle size of from about 200 to about 950 micrometers.

A preferred embodiment of this invention relates to a process for removing copper ions from such highly acidic waste water comprising passing said highly acidic waste water at a pH less than about 1 upward through a fluidized bed of iron particles having a particle size of from about 200 to about 950 micrometers at a flow rate sufficient to fluidize the iron particles.

DETAILED DESCRIPTION OF THE INVENTION

Figure 1:
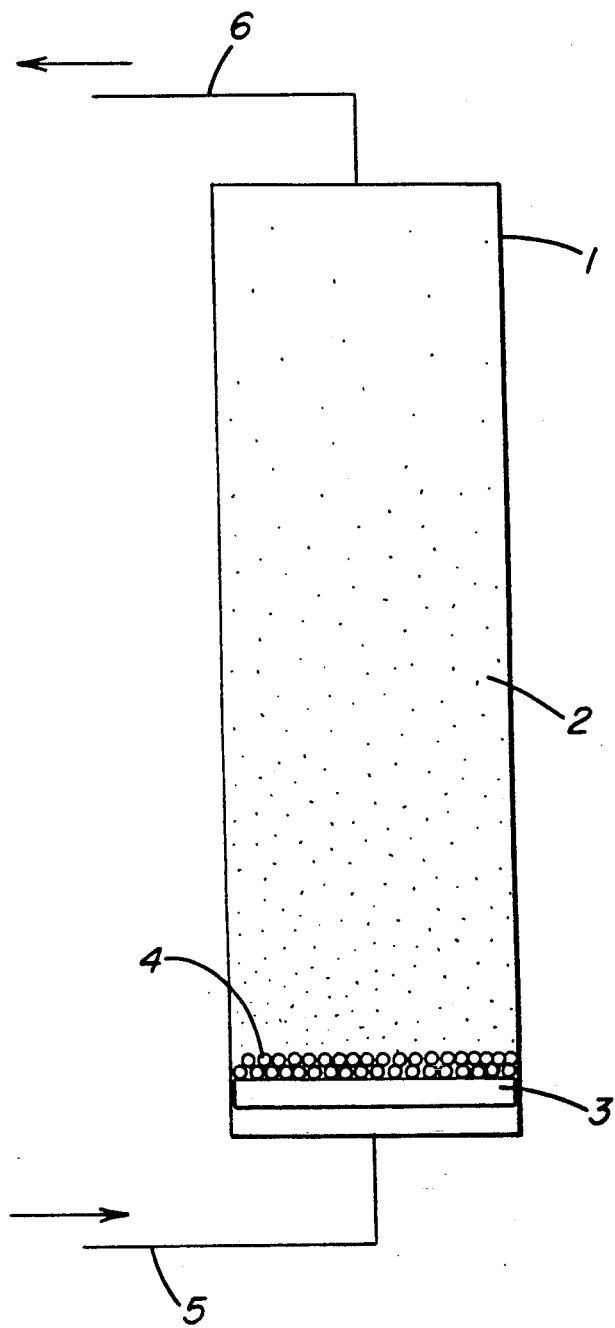
FIG. 1 is a schematic side view representation of a fluidized bed column according to the invention.

The suspended particles used according to the invention include those made of iron or alloys, preferably containing at least 90% by weight iron. A suitable iron alloy is steel, a group of iron alloys containing minor amounts (generally 0.02 to 1.5%) of carbon. Particles made of essentially pure iron are preferred because of the need for less frequent handling, lower cost, and fewer side reactions (which could release various heavy metal ions).

Suspension of the particles can be accomplished, for example, by agitation, stirring, or other methods that provide sufficient fluid motion to keep at least a portion of the iron particles in a substantially fluidized state. To retard fusion of the particles, it is preferred that all of the particles be suspended at some time and that at least half (preferably at least 90%) of the particles be suspended at any given moment. A particularly preferred method involves suspending the particles as a fluidized bed in a column, a technique that is eminently suited to continuous removal of copper from waste streams. A packed bed, such as provided by unstirred batch methods or by downward flow through a column containing iron, can initially be more efficient than a fluidized bed because the copper-containing liquid is in more intimate contact with the iron. However, packed beds rapidly become unsuitable as the flow channels become clogged with deposited copper.

For the preferred fluidized bed method of this invention, high flow rates must be used to maintain the bed of iron in an essentially fully fluidized state. Fluidizing the iron particles maximizes the exposure of iron surfaces to copper ions and inhibits the bonding together of the iron particles. Furthermore, fluidizing prevents channeling caused by the evolution of hydrogen gas during the competing reaction of acid with the iron, thereby further improving the efficiency of the copper removal. As a result of the high flow rates, the process is characterized by a high throughput, especially when using large diameter fluidized bed columns. The method is particularly suited for use in a continuous process and, therefore, has essentially no volume limitations.

The flow rate must, of course, be sufficient to fluidize the iron particles. If the coarser particles are not suspended, the efficiency of the process can be adversely affected. On the other hand, smaller iron particles can be carried away if an excessively high flow rate is used. To fluidize the bed, the flow rate is increased until the pressure drop across the bed equals the force of gravity exerted on the bed and the particles start to float. Once the bed begins to fluidize, the pressure drop does not increase with increasing flow rate. Instead, the bed height expands until at some maximum flow rate the particles are entrained in the waste stream and the bed is carried out of the fluidizing apparatus. One skilled in the art can readily determine the appropriate flow rate for each system. For example, the theoretical fluid velocity at which a bed begins to fluidize can be calculated using the following empirical equation:

$$U_{mf} = \frac{\mu}{d_p \rho_L} \left[ \left( (33.7)^2 + \frac{0.0408 \, d_p^3 \rho_L (\rho_m - \rho_L) g}{\mu^2} \right)^{\frac{1}{2}} - 33.7 \right]$$

where $U_{mf}$ is the critical fluidization velocity in cm/sec, $\mu$ is the fluid viscosity in g/cm·sec, $d_p$ is the particle diameter in cm, $\rho$ is density in g/mL (with the subscript m representing the particle and subscript L representing the flowing liquid), and g is the gravitational acceleration in cm/sec$^2$. The actual flow rate needed is dependent on the shape of the particles, as well as on other factors. For example, the geometry of the fluidizing apparatus can even affect the fluidizing process. The apparatus can take the general form of a cylinder having a uniform diameter, an inverted cone, or some other configuration known in the art, each of which provides differing fluidizing characteristics.

The time during which the waste water is in contact with the iron particles, and hence the time during which reaction can occur, is related to flow rate as well as bed size. Thus, although the contact time can be increased by increasing the height of the iron bed, it can also be increased by reducing the flow rate (provided, of course, that the flow rate remains sufficiently high for fluidization).

The particle size of the iron or steel used can affect the efficiency of copper removal by the process of the invention. For example, smaller particle sizes can provide greater surface area for a given weight of iron and can thus further enhance the efficiency of the process. At the same time, however, particles that are too small can more easily be carried out of the apparatus and can also cause excessive generation of hydrogen gas. It has been found that iron particles having a particle size of from about 200 to about 950 micrometers are particularly suitable for use in a fluidized bed according to the invention. For particles in this size range, the preferred flow rate is selected such that the fluidization velocity is from about 1 to about 20 cm/sec, more preferably 1 to 12 cm/sec. Although not critical, the use of a narrow distribution of particle size for a given bed helps avoid loss of fluidized fines. Particles having somewhat irregular shapes also increase the surface area of such particles and, with careful selection, can provide efficient removal of copper without excessive hydrogen generation. Particularly effective results can be achieved using chilled iron or steel grit, which is prepared by forming beads by pouring molten iron or steel into a cooled liquid such as water and then grinding the resultant metal beads to irregular pieces of the appropriate size distribution. A grit size of G-40 (for which 95% is retained by a 40 mesh screen) has been found to be particularly effective. When using G-40 chilled iron grit, a particularly preferred fluidization velocity is 3 to 11 cm/sec.

The specific nature of an acidic waste stream may, of course, depend on the chemical process that generates the waste stream. Consequently, the efficiency of the process of the invention may vary somewhat according to the particular acidic waste stream being treated. Although not suggested by the scientific literature, it has been found that the efficiency of the process can be optimized for each acidic waste stream by choosing appropriate iron particle sizes within the range described above.

Despite contrary teachings found in the literature, the process of the present invention is particularly suited to the removal of copper from highly acidic solutions. For example, copper can be removed efficiently from aqueous solutions containing 2N acid concentrations. For waste streams generated during the manufacture of certain dyes or pigments or their intermediates, removal of copper is often less efficient when pH is greater than about 1. Thus, while it is possible to use the process of the invention in less acidic conditions, waste streams having higher acidity levels are preferred.

The temperature at which the process is carried out is generally not critical. It has been found, however, that the process does not efficiently remove copper when carried out below a minimum temperature that appears to be somewhat dependent upon the composition of each waste stream. It has also been observed that the increase in removal of copper with increasing temperature may sometimes be greater than expected in literature. Cf. W. W. Fisher, *Hydrometallurgy*. 16, 55–67 (1986); R. M. Nadkarni and M. E. Wadsworth, "A Kinetic Study of Copper Precipitation on Iron: Part II" in *Trans. Metallurgical Soc. AIME*, 239, 1066–1074 (1967). For example, a minimum temperature of about 30° C. was required for the removal of more than 90% of the copper from waste streams generated during the preparation of C.I. Pigment Blue 15. In general, the preferred temperature is at least 20° C., more preferably from 30° to 70° C.

FIG. 1 illustrates a fluidized bed column used according to the preferred method of the invention. Column 1 is used to contain the fluidized iron bed 2 through which the copper-containing waste water flows for removal of the copper. Although the shape of column 1 can affect the fluidizing process, it is sufficient for column 1 to be a vertically oriented cylinder having a uniform diameter throughout the region in which the fluidized bed is contained. Fluidized bed 2, which is maintained within the lower section of column 1, is comprised of fluidized iron particles having a particle size of about 200 to about 950 micrometers (preferably 600 to 800 micrometers), with chilled iron grit being preferred. The height of column 1 should be selected to provide a sufficient volume above the fluidized iron bed to minimize the loss of iron caused by entrainment of iron particles in the waste water as it flows rapidly through and then out of the column.

Distribution plate 3, which establishes the lower boundary of the fluidized iron bed, is perforated with numerous openings spaced over the entire plate that allow the upward flow of the waste water to be spread across the entire width of the column. The distribution plate should, of course, be made of a material that is substantially unreactive when exposed to the conditions of the process of the invention, such as polypropylene, Teflon fluorinated polymers, or fiberglass. Distribution plate 3, in combination with the cylindrical cross-section of the fluidized bed within column 1, produces a relatively uniform flow of liquid throughout the fluidized bed and, as a result, provides more uniform fluidization. The distribution plate can be, for example, a perforated plate or a wire mesh. The openings in the distribution plate are preferably sufficiently small to prevent or at least retard the downward passage of the iron particles. In a more preferred embodiment, however, distribution plate 3 is covered with a layer of essentially unreactive billets 4 that are too massive to be fluidized and thus prevent the fluidized particles from falling into and plugging the openings in the distribution plate. Because placement of billets on the distributor plate allows the use of larger openings, insoluble materials in the feed stream are less likely to cause blockage. In addition, the layer of billets 4 assures an even distribution of waste water throughout the fluidized bed. The billets must, of course, be larger than the openings in the distribution plate. The billets can be made of any essentially unreactive material that can withstand the mechanical stresses inherent to the operation of the fluidizing apparatus, including, for example, any of various metals (such as copper), plastics, or ceramics that do not react under the conditions of the process and, of course, that have a sufficient size and mass to avoid being themselves fluidized. The billets can be made, for example, by cutting suitable rods to the desired length. When copper billets are used, the initial rate of copper removal, surprisingly, is enhanced.

The copper-containing waste water is introduced into column 1 at inlet 5 after optional preliminary steps, such as filtration to remove particulates. Suitable pumps are used to maintain waste water flow at a rate sufficient to hold the iron particles of iron bed 2 in a fluidized state. Although the fluidized bed has been found to be relatively insensitive to suspended particulate matter, high levels of suspended organic matter can plug the holes of distribution plate 3 and/or can coat the iron particles, thereby reducing the efficiency of the process. In addition, separate disposal of the insoluble matter reduces the level of extraneous materials that would remain in the effluent. Therefore, preliminary filtration is preferred.

After passing through the fluidized iron bed and optional grate, the treated waste water is removed through outlet 6 for disposal or further treatment. For example, hydrogen gas generated as a by-product of the process should be removed using a gas separator and acid should be neutralized before discharge. In addition, any iron particles that may have escaped from the column can be allowed to settle out for recovery.

Figure 2:
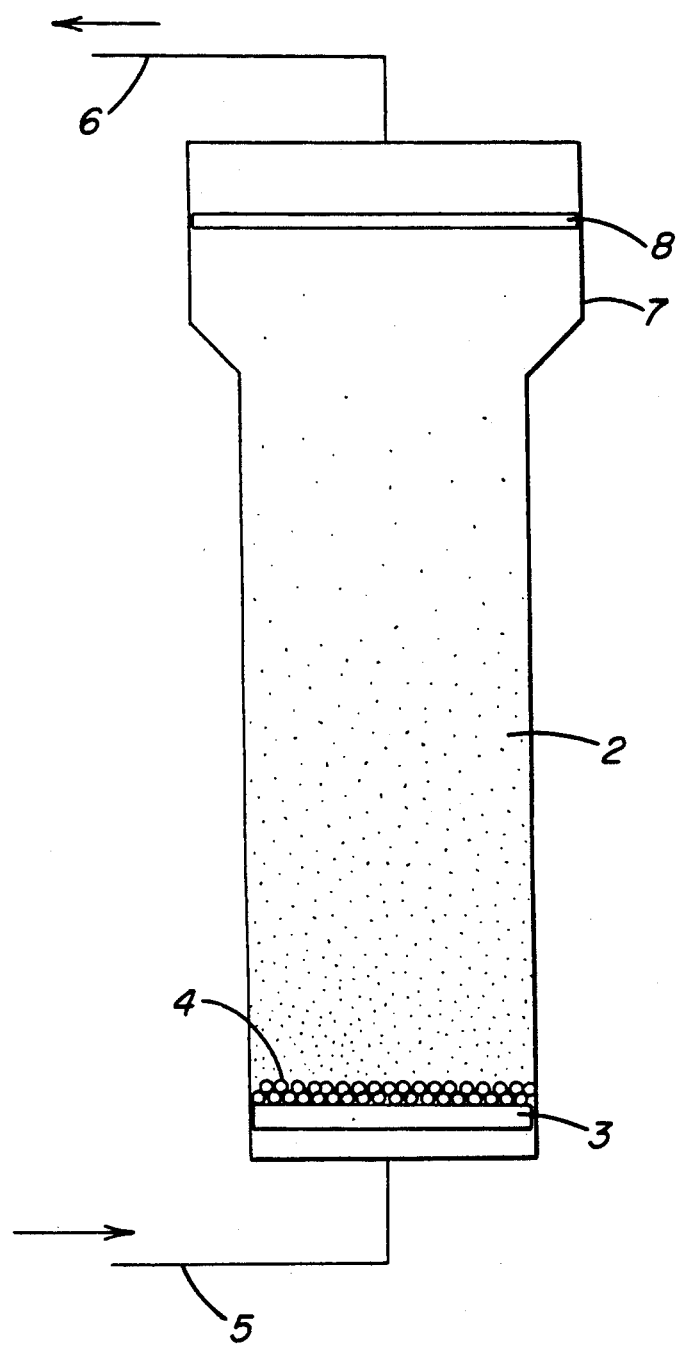
FIG. 2 is a schematic side view representation of a variant of a fluidized bed column according to the invention having additional features for minimizing the loss of entrained iron particles.

FIG. 2 illustrates a variant of the fluidized bed column having design features that further reduce the loss of entrained iron particles. An optional expanded section 7 of column 1 located above the fluidized bed region reduces the loss of iron while at the same time requiring less vertical space than otherwise would be necessary. In addition to or instead of the optional expanded section of column 1, an optional grate 8 placed in the column above the fluidized bed can further minimize the loss of iron. Each of these optional features can, of course, be used independently of the other.

Although the removal of copper ions can in theory be carried out until the iron is exhausted, the process is generally stopped before exhaustion, at least in part because the rate and efficiency of copper removal normally declines as the available surface area of iron decreases.

When removed from the fluidizing apparatus, the spent copper-coated iron particles can be discarded or the copper metal can be recovered. In addition, because the initial rate of copper removal according to the invention can be enhanced by "striking" the iron bed with a small quantity of copper, each new iron bed can be charged with a portion of the recovered copper-coated iron, preferably in an amount such that about 1% copper is present. A similar initial enhancement can occur when using copper billets in the fluidizing apparatus.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples 1–3

Fluidized bed method

Effluents generated during the preparation of selected dyes and pigments were passed through fluidized beds contained within vertically oriented columns of uniform diameters, each of which was fitted at the lower end with a perforated distribution plate consisting of a disk having holes placed in a triangular-pitch pattern. The columns used in the Examples were as follows:

(a) a glass column having a diameter of 5 cm and a height of 1.5 m fitted with a 3-mm thick disk made of Teflon polymer and having 57 holes, each of which was 4 mm in diameter;

(b) a polyvinyl chloride (PVC) column having a diameter of 15 cm and a height of 2 m fitted with a 1-cm thick PVC disk having 483 holes, each of which was 5.5 mm in diameter; and (c) a fiberglass column having a diameter of 30 cm and a height of 5 m fitted with a 2.54-cm thick fiberglass disk having 444 holes, each of which was 2.4 mm in diameter.

After each column was half filled with water, the distribution plate was covered with copper billets (cylindrical rods having a length of about 1.3 cm and a diameter of about 0.64 cm). To the column was then added G-40 chilled iron grit (obtained from U.S. Abrasives and from Globe Steel Abrasives, Mansfield, Ohio), which consisted of irregularly shaped iron particles having an average diameter of about 760 microns and a particle size range such that 95% of the particles are retained on a 40-mesh screen.

The copper-containing waste streams described in the Examples were pumped through the column at a constant flow rate that fully fluidized the G-40 chilled iron grit, the exact flow rate needed to provide good fluidization being dependent on particle size distribution. Waste streams having heavy particulate loads were passed through a bag filter before being introduced into the fluidizing apparatus. Flowmeters and flow control valves, as well as associated instrumentation and surge tanks, were used to maintain a constant flow through the fluidizing apparatus.

Copper removal was periodically monitored for each fluidized bed column by atomic absorption flame photometry using a Perkin Elmer Model 403 instrument. Periodic sampling was also used to determine when the iron bed was exhausted. The physical parameters for the fluidized beds are summarized in Table I.

TABLE I

Fluidized bed columns.

| Column | Column diameter (cm) | Weight of iron (Kg) | Flow rate range (L/min) | Temperature range (°C.) |
|---|---|---|---|---|
| (a) | 5 | ca. 5 | 4–6 | 20–60 |
| (b) | 15 | 50–85 | 75–115 | 20–80 |
| (c) | 30 | 500 | 300–400 | 20–40 |

Example 1

Effluent from Pigment Blue 15

A filtrate from the preparation of C.I. Pigment Blue 15 (about 265,000 liters) contained 26 g/L of $H_2SO_4$, 5 g/L of HCl, 0.3 g/L of $SO_2$, and 0.1 g.L of HI (all estimated based on material balance) and 41–45 ppm copper (determined by flame photometry). The acidic filtrate was prefiltered using a 100-μm bag filter and then pumped through column (c) (containing 500 Kg of fresh G-40 iron grit) at a flow rate of about 303 L/min (fluid velocity of ca. 7 cm/sec) at a temperature of 35°–36° C. Removal of 98% of the copper was obtained.

In 69 similar experiments using this column, copper removal averaged 95.9% (range 46–100%). The lower removal efficiencies were obtained after repeated use of the same iron but high efficiency could be restored by replacing the iron.

Temperatures greater than 35°–36° C. could be used but column life is shortened.

Essentially the same results were obtained using columns (a) and (b).

In other experiments using effluents from the preparation of Pigment Blue 15, the removal of copper declined to the 30–50% range when the waste streams had a high organic solids content and was not prefiltered, when the temperature was less than about 20° C., when fluid velocities were less than 3 cm/sec (that is, when the bed was not fully fluidized), and when surface active agents were present in the waste streams.

Example 2

Effluents from Acid Blue 324

(a) Acidic effluent.

(a)(1) A filtercake containing C.I. Acid Blue 324 (3045 Kg) was washed with about 42,000 liters of water containing 2% NaCl and 5% $H_2SO_4$. The resultant wash liquor contained 465 ppm copper. The acidic wash liquor was pumped through column (b) (containing 68 Kg of fresh G-40 iron grit and 13.6 Kg of copper-coated iron particles from a previously used column) at a flow rate of about 76 L/min (fluid velocity of ca. 7 cm/sec) at a temperature of 32° C. The average copper removal efficiency was 95.9% (range 84.9–99.7%).

(a)(2) A filtercake containing C.I. Acid Blue 324 (2982 Kg) was washed with about 42,000 liters of water containing 2% NaCl and 5% $H_2SO_4$. The acidic wash liquor, which contained 932 ppm copper, was prefiltered using a 100-μm bag filter and then was pumped through column (c) (containing 500 Kg of fresh G-40 iron grit) at a flow rate of about 303 L/min (fluid velocity of ca. 7 cm/sec) at ambient temperature. Removal of 98% of the copper was obtained.

In 4 similar experiments using this column, copper removal averaged 96.4% (range 92–99.2%).

In other experiments using acidic effluents from the preparation of Acid Blue 324, the removal of copper declined to the 40–80% range when the waste stream was not prefiltered or when the temperature was less than about 30° C.

(b) Essentially non-acidic effluent.

Waste streams from the production of C.I. Acid Blue 324 containing 1000–1650 mg/L of copper, 30–40 g/L of $NaHSO_3$, 50–67 g/L of $NaHCO_3$, 20–25 g/L of NaCl, 20–30 g/L of organic matter, and smaller quantities of EDTA tetrasodium salt and sodium acetate were acidified with sulfuric acid to a pH less than 1 and prefiltered to remove any insoluble organic matter. The acidified solutions were passed through column (a) at a temperature of 50°–70° C. at a fluid velocity of about 7 cm/sec. Copper removal was greater than 95%.

Acidification of the waste streams can also be achieved by addition of acidic waste streams such as described in Example 1. Copper removal is generally comparable.

Removal of copper from the effluents of Example 2(b) was typically not as efficient as for the effluents of Example 2(a). This lower efficiency may be attributed to residual insoluble organic matter and to the presence of sodium bisulfite.

Removal of copper further declined to the 0–50% range when the pH was greater than 3, when the waste streams was not prefiltered, or when the temperature was less than about 50° C.

Example 3

Effluent from Direct Blue 199

In a preparation of C.I. Direct Blue 199, the filtrate obtained when collecting the filtercake and the wash liquor from an acidic wash of the filtercake were combined and further acidified by addition of $H_2SO_4$. The resultant solution contained approximately 205 g/L of $H_2SO_4$, 60 g/L of HCl, and 9 g/L of $SO_2$ (all estimated based on material balance) and 408 ppm copper (determined by flame photometry). The solution was pumped through column (c) (containing 500 Kg of fresh G-40 iron grit) at a flow rate of about 303 L/min (fluid velocity of ca. 7 cm/sec) at ambient temperature. Removal of 95% of the copper was obtained.

In 20 other similar experiments using this column, copper removal averaged 91.0% (range 72–99.8%). Although the initial filtrate used in these other experiments was already at a pH less than 1, removal of copper from these waste streams was more efficient if additional sulfuric acid was used. Efficiencies were also improved by periodically replacing the iron grit. In general, removal of copper declined to the 20–70% range when the waste streams were not prefiltered, when the temperature was less than about 30° C., and when sulfuric acid was not added.

Examples 4–6

Batchwise method

Example 4

Acidic copper sulfate solution

An aqueous solution containing 22 ppm of copper was prepared by mixing 50 ml of aqueous copper sulfate (approx. 40 ppm copper) and 50 ml of 4% aqueous sulfuric acid. To the acidic copper solution was added 5 g of G-50 chilled iron grit and the mixture was shaken for 5 minutes using an orbital shaker table (200 rpm). The iron was then removed by gravity filtration through Whatman No. 3 filter paper. The filtrate contained 0.57 ppm copper (97% removal).

Example 5

Effluent from Pigment Blue 15

A filtrate from the preparation of C.I. Pigment Blue 15 (200 ml) containing 30 g/L of $H_2SO_4$, 6 g/L of HCl, 0.5 g/L of $SO_2$, and 0.1 g.L of HI (all estimated based on material balance) and 112 ppm copper (determined by flame photometry) was stirred with G-40 chilled iron grit (5 g) in an open container at 200 rpm for 15 minutes at 15° C., 25° C., and 35° C. The removal of copper was 59.8% at 15° C., 81.3% at 25° C., and 86.6% at 35° C.

The lower removal of copper at 15° C. is consistent with similar temperature experiments mentioned in Example 1.

Example 6

Multiple batchwise experiments (a) Two samples of a filtrate from the preparation of C.I. Pigment Blue 15 (9.9 ppm copper at pH less than 1) were separately mixed in sequence with a single batch of G-40 chilled iron grit (5 g). Each sample was shaken for 10 minutes using an orbital shaker table (200 rpm) and removed for determination of copper content. The iron was flushed with water before each new sample was added. Copper removal efficiencies were 79.8% and 73.8%, respectively.

(b) Two samples of a filtrate from the preparation of C.I. Direct Blue 199 (233 ppm copper at pH less than 1) were separately mixed in sequence with a single batch of G-40 chilled iron grit (5 g) and then handled exactly as in Example 6(a) Copper removal efficiencies were 76.8% and 75.6%, respectively.

A mixture containing about 2 parts of an effluent similar to that used in Example 1 and about 1 part of an effluent similar to that used in Example 2(b) (totaling 640 ppm copper and ca. 0.24N acid) was passed downward through a 15-cm column containing 9 Kg of G-80 chilled iron grit in a packed bed (approx. 15-20 cm depth) at a flow rate of about 4 L/min. Initial copper removal was about 99% (occurring almost exclusively at the top 20% of the bed) but the column became completely plugged and unusable after about 3.5 hours.

What is claimed is:

1. A process for removing copper ions from acidic waste water generated during the manufacture of dyes or pigments or intermediates thereof comprising exposing said acidic waste water at a pH less than 1 to a bed of suspended iron particles containing at least about 90% by weight iron and having a particle size of from about 200 to about 950 micrometers.

2. A process according to claim 1 for removing copper ions from acidic waste water generated during the manufacture of dyes or pigments or intermediates thereof comprising passing said acidic waste water at a pH less than 1 upward through a fluidized bed of iron particles having a particle size of from 200 to 950 micrometers at a flow rate sufficient to fluidize the iron particles.

3. A process according to claim 2 wherein the fluidized bed is contained within a cylindrical column.

4. A process according to claim 2 wherein the iron particles have a particle size of 600 to 800 micrometers.

5. A process according to claim 2 wherein the iron particles have an average particle size of 760 micrometers.

6. A process according to claim 5 wherein the flow rate corresponds to a fluidization velocity of 3 to 11 cm/sec.

7. A process according to claim 2 wherein the flow rate corresponds to a fluidization velocity of 1 to 12 cm/sec.

8. A process according to claim 2 wherein the fluidized bed initially contains a portion of copper-coated iron particles.

9. A process according to claim 2 wherein essentially unreactive billets are placed below the fluidized bed of iron particles.

10. A process according to claim 9 wherein the billets are copper rods.

11. A process according to claim 2 wherein said process is carried out at a temperature of at least 20° C.

12. A process according to claim 2 wherein said process is carried out at a temperature of from 30° C. to 70° C.

13. A process according to claim 1 wherein said process is carried out at a temperature of at least 20° C.

14. A process according to claim 1 wherein said process is carried out at a temperature of from 30° C. to 70° C.

* * * * *